United States Patent [19]

Clelford et al.

[11] Patent Number: 4,741,501
[45] Date of Patent: May 3, 1988

[54] PREVENTING AUGMENTING VERTICAL LOAD INDUCED OSCILLATIONS IN A HELICOPTER

[75] Inventors: Douglas H. Clelford; Richard D. Murphy, both of Trumbull; Franklin A. Tefft, Killingworth, all of Conn.

[73] Assignee: United Technologies Corporation, Hartford, Conn.

[21] Appl. No.: 65,104

[22] Filed: Jun. 26, 1987

Related U.S. Application Data

[63] Continuation of Ser. No. 819,188, Jan. 15, 1986, abandoned.

[51] Int. Cl.⁴ .................................................. B64C 27/57
[52] U.S. Cl. ................................................... 244/17.13
[58] Field of Search ................ 244/17.13, 137 A, 221, 244/75 R, 76 R

[56] References Cited

U.S. PATENT DOCUMENTS

| | | | |
|---|---|---|---|
| 3,756,543 | 9/1973 | Fowler et al. | 244/17.13 |
| 3,833,189 | 9/1974 | Fowler et al. | 244/17.13 |
| 4,279,391 | 7/1981 | Adams et al. | 244/17.13 |

FOREIGN PATENT DOCUMENTS 1418940 12/1975 United Kingdom ........... 244/137 A

Primary Examiner—Joseph F. Peters, Jr.
Assistant Examiner—Rodney Corl

[57] ABSTRACT

Collective stick inputs are provided (18) to a high pass filter (24) when collective stick reversals in excess of a threshold collective authority rate (15%/sec) and in excess of a threshold frequency (3 stick reversals per second) are sensed. The output of the high pass filter (24) is scaled (26) and subtracted (14) from the collective inputs so as to effectively cancel the threshold stick reversals. Otherwise, if no stick reversals in excess of the threshold collective authority rate are sensed for a threshold time interval (5 seconds), the collective stick inputs are not provided to the high pass filter.

7 Claims, 1 Drawing Sheet

PREVENTING AUGMENTING VERTICAL LOAD INDUCED OSCILLATIONS IN A HELICOPTER

The Government has rights in this invention pursuant to Contract No. N0019-82-C-0127 awarded by the Department of the Navy.

This is a continuation of Ser. No. 819,188, filed Jan. 15, 1986, now abandoned.

BACKGROUND OF THE INVENTION

Helicopter lifting and transportation of external loads on a single point or dual point cable system is a high work load operation requiring the pilot's constant attention. A load suspended beneath a helicopter by one or more cables or slings forms a spring-mass system which is easily excited into oscillation in the vertical direction—the pilot may interact with this oscillation in a phenomenon commonly called vertical bounce. The excitation can result from a variety of phenomenon, including wind gusts, air pressure drops, abrupt pilot input, abrupt load pickup, etc. The frequency of vertical oscillation is a complex function of the mass of the load, the characteristics of the cable, the dynamics of the helicopter, and the physiological characteristics of the pilot. Since the pilot's body is subject to oscillation of the aircraft, if his hand is on the collective pitch control stick (as is normally the case), his body motion can cause reinforcement of the oscillations through collective stick inputs to the control system. There is also a natural tendency for the pilot to attempt to compensate for the oscillations—that is, to counteract them with corrective inputs to the collective pitch stick. However, due to human reaction lag and lag in aircraft and load response, such inputs tend to reinforce, rather than cancel, the oscillations.

The vertical bounce mode is totally different from the pendular, horizontal modes controlled by the inner stability loop in the manner described in commonly-owned U.S. Pat. Nos. 3,756,543 and 3,833,189.

In the past, the only solution to the vertical bounce problem was to have the pilot simply take his hand off the collective pitch control stick. This would allow the vertical oscillations to dampen naturally, and die down. However, this is a very unnatural act for a pilot, and could be dangerous during close maneuvering. As a consequence, many loads have been jettisoned so as to save the helicopter.

It has been known to utilize control desensitizer systems in the pitch, roll and yaw axes, to reduce the tendency for pilot interaction with the helicopter's fundamental fuselage bending mode frequencies. The interaction may manifest itself passively as a result of fuselage vibrations being transmitted through the pilot's seat, through his body and arms or legs, to control sticks and pedals. Natural frequencies of on the order of several Hertz (Hz) are common (depending on the craft, the load and the pilot). These interactions have been desensitized by a filtered feedback system that continuously senses high frequency (several Hz) stick and pedal inputs, and cancels them. An example is shown in commonly-owned U.S. Pat. No. 4,279,391 to Adams et al.

The use of a system as in Adams et al has been found to be impractical for desensitizing the vertical bounce mode because the vertical oscillation frequency is so low (on the order of one-half Hz to several Hz) that high-pass filtering of unwanted oscillations can be achieved only with a corresponding reduction in normal aircraft handling quality.

In "Rotor and Wing International", September 1985, at pp. 15-16, it is suggested that the collective pitch stick can be locked with friction or a soft spring on the stick can reduce its natural frequency below two Hz. But these suggestions are not deemed to present adequate solutions.

DISCLOSURE OF THE INVENTION

Therefore, it is an object of this invention to significantly reduce pilot interaction with the spring-mass system formed by a helicopter supporting a suspended load, thereby to reduce the vertical oscillations associated with a load suspended from a helicopter.

According to the invention, collective stick inputs are provided to a high pass filter when collective stick reversals in excess of a threshold collective authority rate (15%/sec) and in excess of a threshold frequency (3 stick reversals per second) are sensed. This output of the high pass filter is scaled and subtracted from the collective inputs so as to effectively cancel the stick reversals provided by the pilot. Otherwise, if no stick reversals in excess of the threshold collective authority rate are sensed for a threshold time interval (5 seconds), the collective stick inputs are not provided to the high pass filter, and the pilot then has uncompensated control.

Other objects, features and advantages of the invention will become apparent in light of the following description thereof.

BEST MODE FOR CARRYING OUT THE INVENTION

Figure 1:
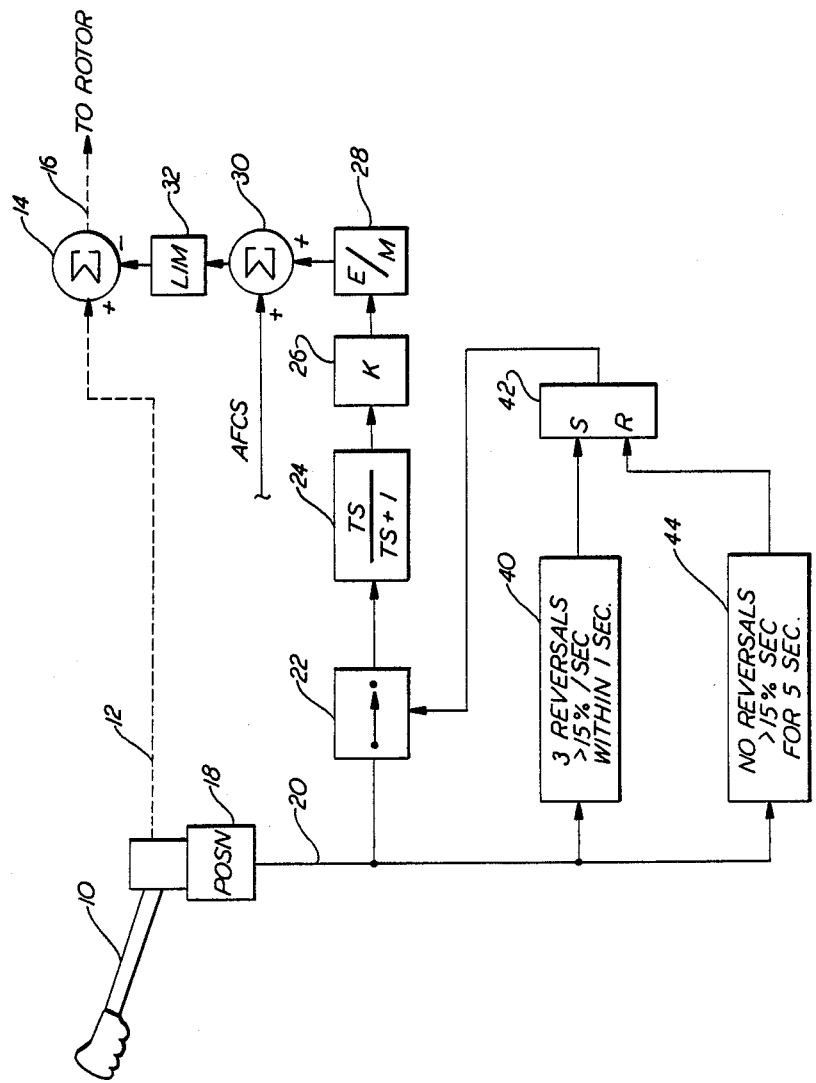
FIG. 1 is a schematic block diagram of this invention.

Basically, the invention eliminates the vertical bounce problem associated with load-lifting by using a high pass filter on the collective inner loop channel to cancel out the pilot's input at the oscillation frequency. The undesirable oscillation reinforcement is thereby eliminated and the initial excitation is allowed to aerodynamically dampen out and converge to zero.

The frequency of the load/cable aircraft system changes as a function of load weight, cable type and length. These frequencies can be as low as 1 Hz which unfortunately is well within the normal range of pilot control inputs. Therefore, continuous filtering as known to the prior art cannot be employed since it will detrimentally affect handling qualities. The present invention permits the filter to be engaged only after an excitation is detected and, disengages when the oscillation is eliminated.

FIG. 1 shows the collective control channel of a helicopter. The pilot's collective stick 10 is connected via a linkage 12 to a mechanical summing junction 14. The output of the summing junction 14 is connected via a linkage 16 to the rotor for collective pitch inputs.

A position transducer 18 provides a signal on a line 20 indicative of collective stick position via a switch 22 to a high pass filter 24. The high pass filter 24 passes alternating collective stick inputs at a frequency greater than approximately 1 Hz (e.g., a 3 db point at about one Hz), and its output is scaled by an amplifier 26 having a gain K.

The output of the amplifier 26 is converted to motion by an electromechanical device 28 which is summed with collective inputs from an altitude hold system at a summing junction 30. The output of the summing junction 30 is limited by a mechanical stop 32, and subtracted at the summing junction 14 from the collective stick input.

Regarding the switch 22 as being closed, the above described system is already in place on the Sikorsky CH-53E aircraft and prevents pilot interaction with airframe bending modes.

Regarding this invention, the collective stick position signal on the line 20 is provided to a circuit 40 that outputs a logic ONE to set a flip-flop 42 if there are at least three collective stick reversals with amplitude greater than 15%/sec collective authority rate with ONE second. This is indicative of the pilot reacting to vertical bounce. Otherwise, the output of the circuit 40 is ZERO.

The collective stick position signal on the line 20 is also provided to a circuit 44 which outputs a logic ONE to reset the flip-flop 42 if no collective stick reversals exceeding the threshold collective authority rate (15%/sec) are sensed for 5 seconds. This is indicative of no pilot reaction to vertical bounce. Otherwise, the output of the circuit 44 is ZERO.

The switch 22 is a suitable logic device that is closed if the output of the flip-flop 42 is logic ONE (set). Otherwise, the switch 22 is open, at which point the high pass filter 24 is effectively removed from the system.

Thus, it is readily observable that when the pilot is reacting to vertical bounce by collective stick reversals, the high pass filter 24 causes the pilot inputs to be cancelled, but does not pass lower frequency signals, so general maneuver inputs are not cancelled. Otherwise, the collective channel operates without the offsetting effect of the high pass filter 24.

The elements 22, 24, 26, 40, 42, and 44 are readily implemented in software. In fact, the invention has only been implemented within a digital flight control computer of the type described in commonly-owned U.S. Pat. No. 4,270,168 using software routines of the general type (e.g., filtering, etc.) described in commonly-owned U.S. Pat. No. 4,564,908. The general equivalence between hardware of the type shown herein, and dedicated digital hardware and software, is described in commonly-owned U.S. Pat. No. 4,294,162.

We claim:

1. A method of preventing augmenting vertical load induced oscillations in the collective control channel of a helicopter, comprising:
   sensing whether collective stick inputs are alternating in excess of a threshold collective authority rate of 15 percent per second and in excess of a threshold frequency; and
   cancelling the alternating collective stick inputs based on the affirmative result of the previous step.

2. A method according to claim 1, wherein the threshold frequency is 3 Hz.

3. A method according to claim 1, wherein said step of cancelling comprises cancelling collective stick inputs occurring at frequencies in excess of a second frequency which is lower than said threshold frequency and not cancelling collective stick inputs occurring at frequencies less than said second frequency.

4. A method according to claim 3, wherein said second frequency is 1 Hz.

5. A system for desensitizing the response of a helicopter supporting a load from pilot-induced inputs resulting from vertical oscillations in the helicopter-load system, said helicopter having a collective pitch control stick and an automatic flight control channel operative, in response to signal inputs, along with said stick to control the collective pitch of the helicopter's main rotor blades, comprising:
   a collective pitch control stick position sensor for providing a stick position signal indicative of the position of said stick;
   a signal receiving input to said automatic flight control channel; and
   signal processing means responsive to said position signal for generating a first signal in response to said position signal having excursions in excess of a threshold magnitude occurring at a frequency in excess of a threshold frequency indicative of positions of said stick related to excursions in commands in opposite directions of a magnitude indicative of more than a threshold rate of total authority at a frequency in excess of said threshold frequency, and for providing to said signal receiving input during the duration of said first signal, a collective pitch command signal having characteristics to cause collective pitch commands substantially opposite to commands provided by said stick as indicated by said position signal, thereby to substantially cancel collective pitch stick commands in excess of said threshold magnitude and frequency.

6. A system according to claim 5, wherein said signal processing means comprises means for providing a second signal in response to said position signal having no excursions of a magnitude indicative of said threshold rate of total authority for a duration of time, for providing a third signal in response to presence of said first signal and thereafter until the next occurrence of said second signal, and for providing said collective pitch command signal to said signal receiving input during the presence of said third signal, thereby to cancel said collective pitch commands during periods of time in which said stick position signal indicates command excursions in excess of said threshold magnitude and frequency and for said duration of time after cessation of command excursions in excess of said threshold magnitude.

7. A system according to claim 5, wherein said signal processing means provides said first signal in response to a threshold magnitude of 15% of authority per second and a threshold frequency of 3 Hz, and provides said collective pitch command signal having characteristics to cause collective pitch commands substantially opposite to commands provided by said stick in excess of about 1 Hz but not below about 1 Hz.

* * * * *